United States Patent
Caraballo

[19]

[11] Patent Number: 5,806,188
[45] Date of Patent: Sep. 15, 1998

[54] SLOTTER

[76] Inventor: Philip J. Caraballo, 7451 Sir Eden Rd., Pensacola, Fla. 32526

[21] Appl. No.: 668,910

[22] Filed: Jun. 24, 1996

[51] Int. Cl.$^6$ .................................................. B23D 21/06
[52] U.S. Cl. ............................... 30/92.5; 30/90.9; 30/93; 30/293; 30/312; 30/505; 30/515; 83/169; 83/446; 83/449; 83/924
[58] Field of Search ..................................... 30/90.3, 90.4, 30/90.8, 90.9, 91.1, 91.2, 92.5, 93, 94, 101, 102, 276, 277.4, 289, 312, 388, 505, 515, 520, 90.1, 90.2, 293; 81/9.51; 83/425, 431, 436.1, 436.15, 436.45, 446, 861, 924, 169, 449, 875

[56] References Cited

U.S. PATENT DOCUMENTS

| | | | |
|---|---|---|---|
| 2,388,698 | 11/1945 | Montgomery | 30/91.1 X |
| 2,830,366 | 4/1958 | Chisena | 30/90.4 X |
| 3,093,023 | 6/1963 | Vail | 83/431 X |
| 3,216,110 | 11/1965 | Stallings | 83/924 X |
| 3,921,482 | 11/1975 | Osborn | 83/185 |
| 3,988,826 | 11/1976 | Heikkala | 30/90.4 |
| 4,753,007 | 6/1988 | Weller | 30/90.3 |
| 4,957,022 | 9/1990 | Harris | 83/16 |
| 5,093,992 | 3/1992 | Temple, Jr. et al. | 30/90.8 |
| 5,107,735 | 4/1992 | Ramun et al. | 83/924 X |
| 5,443,536 | 8/1995 | Kiritsy et al. | 30/90.8 |
| 5,542,327 | 8/1996 | Schultz | 83/431 X |

FOREIGN PATENT DOCUMENTS

| | | | |
|---|---|---|---|
| 258243 | 4/1949 | France | 83/425 |
| 1123431 | 6/1956 | France | 30/91.1 |
| 283893 | 11/1952 | Switzerland | 30/91.1 |
| 1525791 | 11/1989 | U.S.S.R. | 81/9.51 |

*Primary Examiner*—Clark F. Dexter
*Attorney, Agent, or Firm*—Peter Loffler

[57] ABSTRACT

A slotter capable of providing a cut of precise depth into a tube is comprised of a main base and an adjustable roller base capable of extension and retraction from the main base, controllable by an adjustable over-center actuator linkage. A pair of roller sets securely hold the tube within the device. A cutting blade, straddled by a pair of limiting rollers, cuts into the tube. Cutting blade rotation is provided by a pneumatically powered rotational motor.

19 Claims, 5 Drawing Sheets

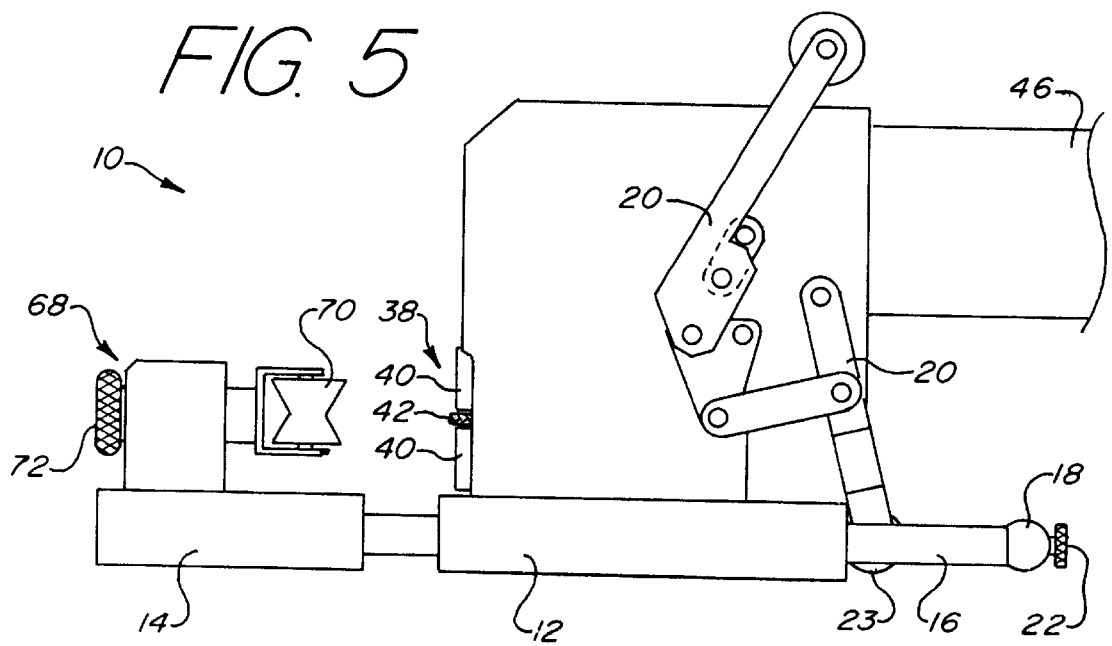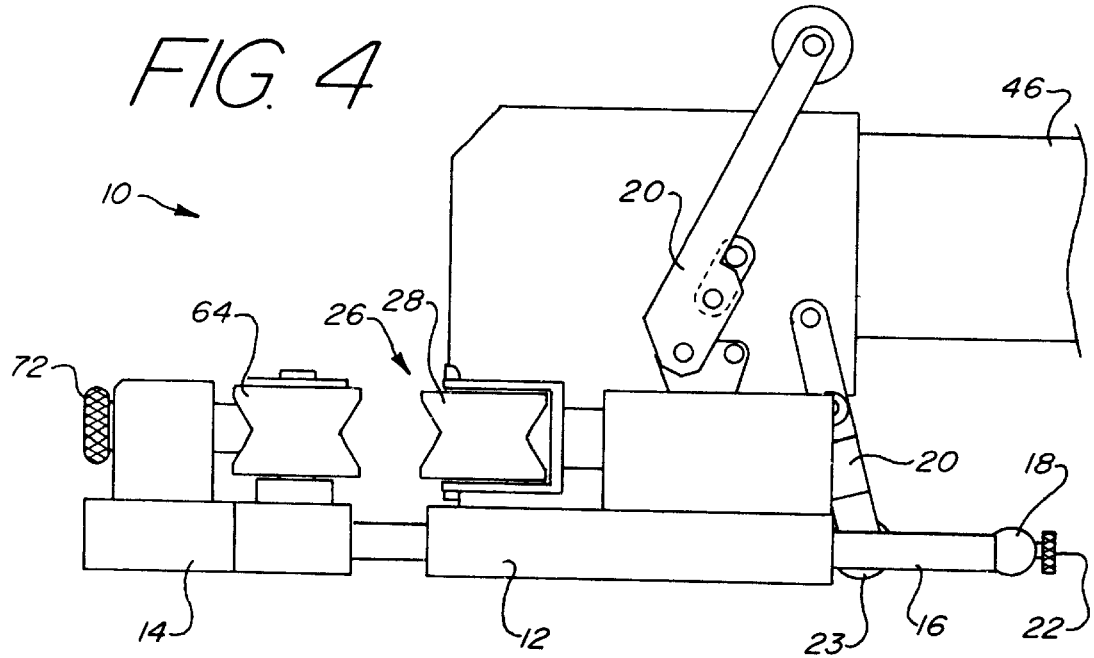

SLOTTER

BACKGROUND OF THE INVENTION

1. Field of the Invention

The present invention relates to a slotter for providing a slot into a pipe or tube in order to gain access thereinto without causing damage to the interior contents of the pipe or tube.

2. Background of the Prior Art

Optical fibers are fast becoming the medium of choice for information transmission. Large capacity, virtually interference free transmissions are possible within a very small set of fibers. Due to their relatively delicate nature, fiber optic bundles are typically shielded in order to protect the fibers. In a typical configuration, several dozen optical fiber strands will be bundled together and a protective tube of plastic or metal will encompass the bundle and thereby protect it. Increasing use of the ground wire, typically made of aluminum or copper alloy, of a high energy transmission line to act as the carrier tube for the fiber optic bundle. As the interior of a cylinder is electrically neutral, the optical fiber bundle and the host ground wire coexist in harmony.

Over time, it becomes necessary to repair or splice one or more of the fiber optic strands housed within the protective tube. This repair is due to element damage, damage due to tube fatigue, stray bullet piercing, etc. Therefore, it becomes necessary to penetrate the protective tube in order to gain access to the fiber optic bundled housed therein. A slit is created along the longitudinal axis of the protective tube permitting access to the bundle.

In order to create the desired slit, various devices have been proposed. Typically, such devices employ a hollow passageway capable of receiving the protective tube and some form of cutting blade or wheel. Such devices are designed to penetrate slightly into the hollow interior portion of the protective tube.

While such devices are met with varying degrees of success, they tend to suffer from one or more drawbacks. Devices employing stationary blades are strictly designed to slit plastic and offer no utility for metal protective tubes.

As the cutting implement penetrates the hollow interior of the protective tube, damage to one or more of the fiber optic strands is possible, especially in a tightly packed configuration. This result is especially undesirable when the fiber optic bundle is live and transmitting data. A second drawback of such devices is that they are configured for a specific diameter size of protective tube as well as a specific thickness of the outer wall of the tube. A different embodiment of a device is required for a different size or different thickness of protective tube, resulting in undue expense and tool congestion for the user. Some devices attempt to overcome this problem by providing an excessively wide passageway diameter with adjustable depth penetration cutting blades, or alternately, spacers with the passageway. Although such alterations will enable the device to accept a wide size variety of protective tube, the tube so received will be relatively unstable resulting in uneven depth penetration of the cutting blade and thus damage to the fiber optic bundle.

It is apparent that a need in the art exists for a device that will permit a user to gain access to a fiber optic bundle contained within a protective tube constructed from any appropriate material. Such a device must be able to provide an access cut into the protective tube, along the tube's longitudinal axis, without penetrating the hollow interior of the tube causing damage to the fiber optics contained therein. Such a device must produce an access cut that is of even depth and that stops just shy of protective tube interior penetration. By providing a slot, as opposed to a slit, the device will not damage housed fiber optic strands, but will provide sufficient violation of the protective tube wall so that a worker can gain final access to the interior of the tube with relative ease and delicacy.

The proposed device must be able to accommodate tubes of varying diameter and wall thickness. The device must be portable and must be simple and straightforward to use. The device must be capable of being operated within high electrical and magnetic fields.

SUMMARY OF THE INVENTION

The slotter of the present invention meets the aforementioned needs in the art. The slotter holds tubes, such as fiber optic bundle protective tubes, and provides a cut of any desired depth into the tube along the tube's longitudinal axis. The device is capable of holding tubes of any desired diameter.

The slotter is comprised of a main base and an adjustable roller base that is capable of back and forth linear translation with respect to the main base. Linear translation is controlled by a variable adjust over centering actuator linkage. A pair of spring-loaded rollers are disposed on either end of the main base, while a corresponding set of rollers are disposed on the adjustable roller base. A cutting blade assembly is disposed on the main base for engaging and cutting a tube introduced onto the device.

The cutting blade assembly is comprised of a cutting blade straddled by a pair of identical limiting rollers. The diameter of the cutting blade is greater than the diameter of the limiting rollers. The device provides a cut into the tube that is equal to one half of the difference between the diameter of the cutting blade and the diameter of the limiting roller. Specifically, the cutting blade cuts into the tube until the limiting rollers engage the non-cut part of the tube and prevent further penetration of the cutting blade into the tube. The cutting blade assembly is quickly detached, permitting quick cutting blade assembly replacement whenever a different cut depth is desired.

A rotation means, of any appropriate design, controls rotation of the cutting blade assembly. The rotation means is recessed within the device in order to prevent operator injury with the housing of the rotation means serving as a handle for the operator of the device. Rotation means power is achieved by pneumatic means with the pressurized air source being from an air canister, or alternately, from a pressurized air generator located remote of the device. Alternately, rotation means power can be achieved by electric or hydraulic means as desired.

A tube is introduced into the device between the two sets of rollers and the actuator linkage locks the tube within the device. If necessary, the actuator linkage is adjusted in order to accommodate the particular size of tube to be cut. An adjustment means is provided for fine tube placement adjustment. The cutting blade assembly is selected and secured to the device and thereafter activated. The user pulls on a handle that extends upwardly from the main base and pulls the device along a length of tube causing the cutting blade to cut the tube along a length of the tube. Cooling means cool the cutting blade assembly during use.

The device is easy and straightforward to use. Different sizes of tubes are accommodated by the device by simple rotational adjustment of the actuator linkage. Different cutting depths can be achieved by simple selection of the cutting blade assembly. Pneumatic power of the device permits remote operation of the device, including in areas of high electric and magnetic fields.

BRIEF DESCRIPTION OF THE DRAWINGS

FIG. 4 is a side view of the slotter.

FIG. 5 is a cutaway view of the slotter taken along line 5—5 in FIG. 1.

Similar reference numerals refer to similar parts throughout the several views of the drawings.

DETAILED DESCRIPTION OF THE PREFERRED EMBODIMENT

Figure 1:
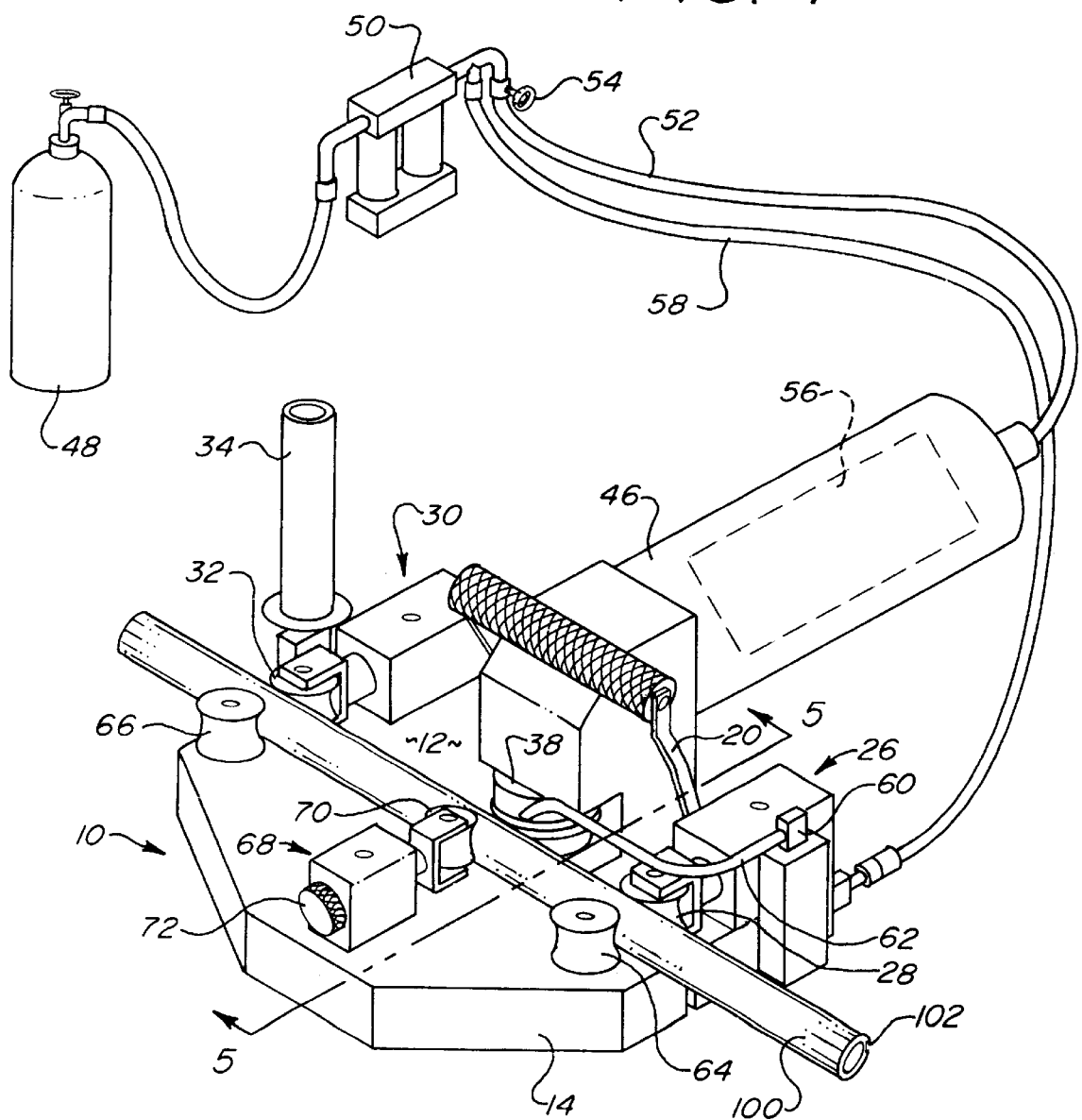
FIG. 1 is an isometric view of the slotter of the present invention.
Figure 3:
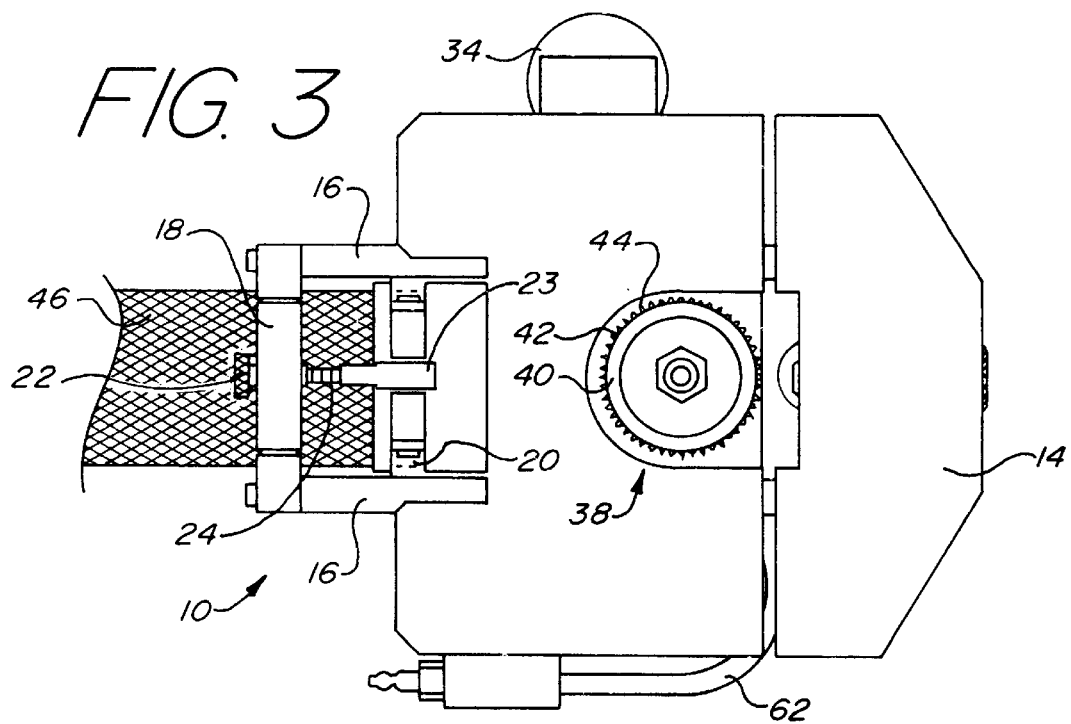
FIG. 3 is a bottom plan view of the slotter.

Referring now to the drawings, it is seen that the slotter of the present invention, generally denoted by reference numeral 10, is comprised of a main base 12 and an adjustable roller base 14 adapted to slide outwardly from the main base 12. Linear movement of the adjustable roller base 14 relative to the main base 12 is accomplished by a pair of slide rods 16 passing through the main base and fixedly attached to adjustable roller base 14. A connecting rod 18 connects the pair of slide rods 16 beyond the main base's end, distant the adjustable roller base 14. An actuator linkage 20, which is a variable adjust over center linkage, connects to the pair of slide rods 16 and controls the linear movement of the adjustable roller base 14 relative to the main base 12. A roller base adjustment knob 22 having a threaded portion 24 passes through connecting rod 18 and is fixedly received within an adjuster tie rod 23 attached to the actuator linkage 20 and provides for the variable adjustment of the actuator linkage 20. Rotation of the roller base adjustment knob 22 causes the locking point of the adjustable roller base 14 to be positioned closer to the main base 12, while counterrotation of the roller base adjustment knob 22 causes the locking point of the adjustable roller base 14 to be positioned farther from the main base 12.

A first roller assembly 26, having a first spring loaded roller 28, is located on one end of the main base 12, while a second spring roller assembly 30, having a second spring loaded roller 32 is located on the opposing end of the main base, laterally aligned with the first roller assembly 26, it being expressly understood that the first roller 28 and the second roller 32 do not have to be spring loaded. A handle 34 extends upwardly from the main base 12.

Figure 2:
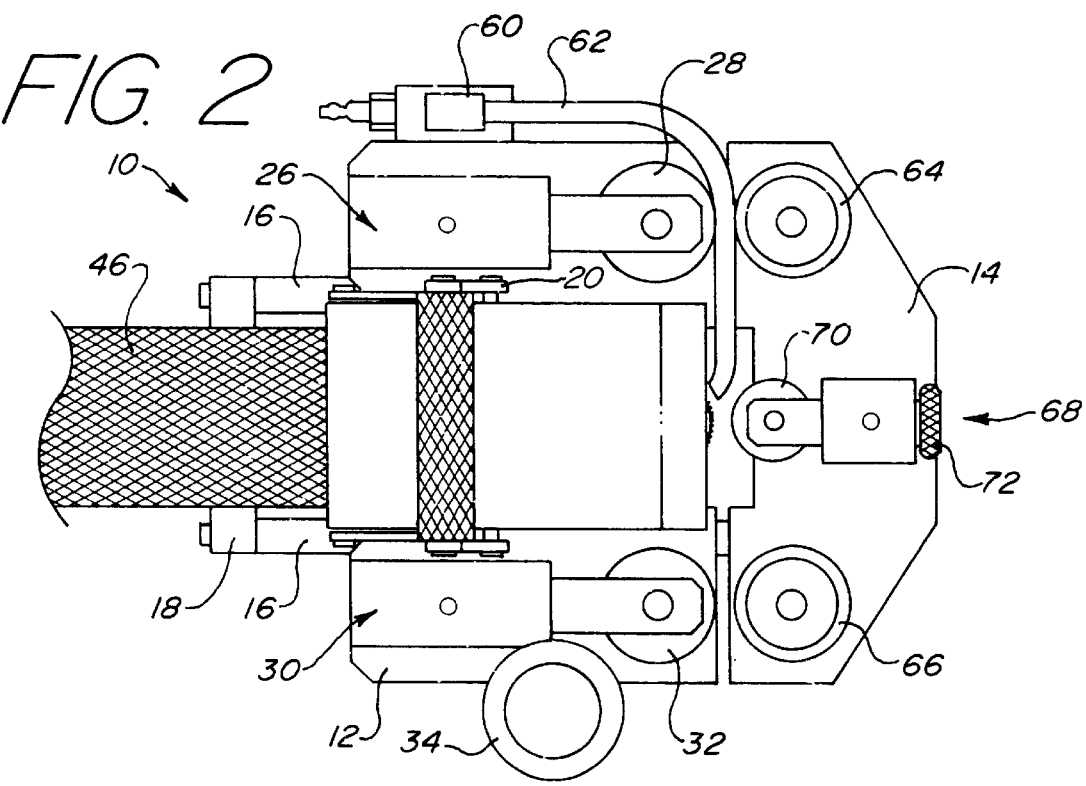
FIG. 2 is a top plan view of the slotter.
Figure 6:
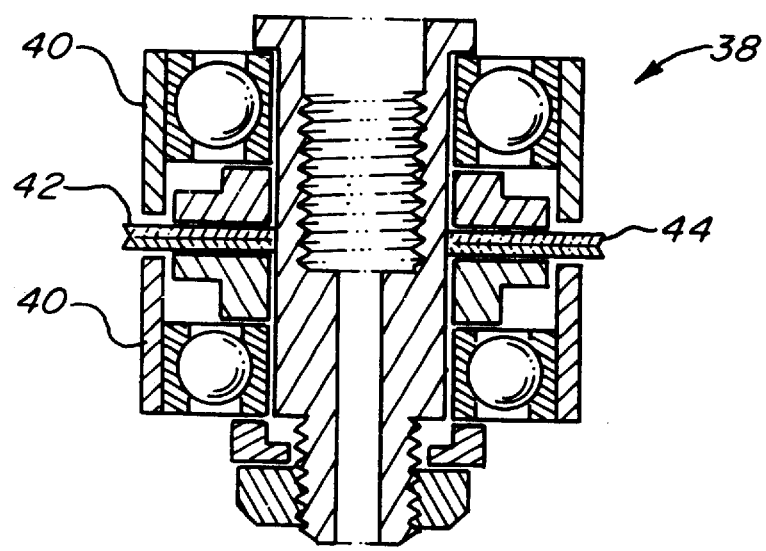
FIG. 6 is a cutaway view of the cutting blade assembly.

A cutting gear assembly or rotation means of any appropriate design (disposed within a housing 46 and therefore not illustrated), is attached to the main base 12. A cutting blade assembly 38 rotatably extends downwardly from the cutting gear assembly. As seen in FIG. 6 the cutting blade assembly is comprised of a pair of identical limiting rollers 40 having a cutting blade 42 disposed therebetween. The teeth 44 of the cutting blade 42 extend beyond the outer periphery of the limiting rollers 40 by a predetermined amount. Rotation of the cutting blade assembly 38 is responsive to activation of a rotation means. Advantageously, the rotation means housing 46 will have a generally cylindrical portion, optionally knurled as shown in FIG. 2, so that the housing 46 may also serve as a handle.

The rotation means is pneumatically powered. As such, a pressurized air canister 48 or other appropriate source of pressurized air, is connected to a two-stage filter system 50 with a first air hose 52 connecting therefrom—through an on/off valve or switch 54—to the air chamber 56 of the rotation means. A second air hose 58 extends from the two-stage filter system 50 to a cooling system 60 having a fluid reservoir (not illustrated) disposed therein. A fixed tube or air hose 62 extends from the cooling system 60 with the end of this air hose 62 positioned over the cutting blade assembly 38. Air flow from the second air hose 58 will draw liquid from the reservoir passing the liquid through the fixed air hose 62 and depositing the liquid onto the cutting blade assembly 38 and thereby cooling the assembly 38.

Figure 7:
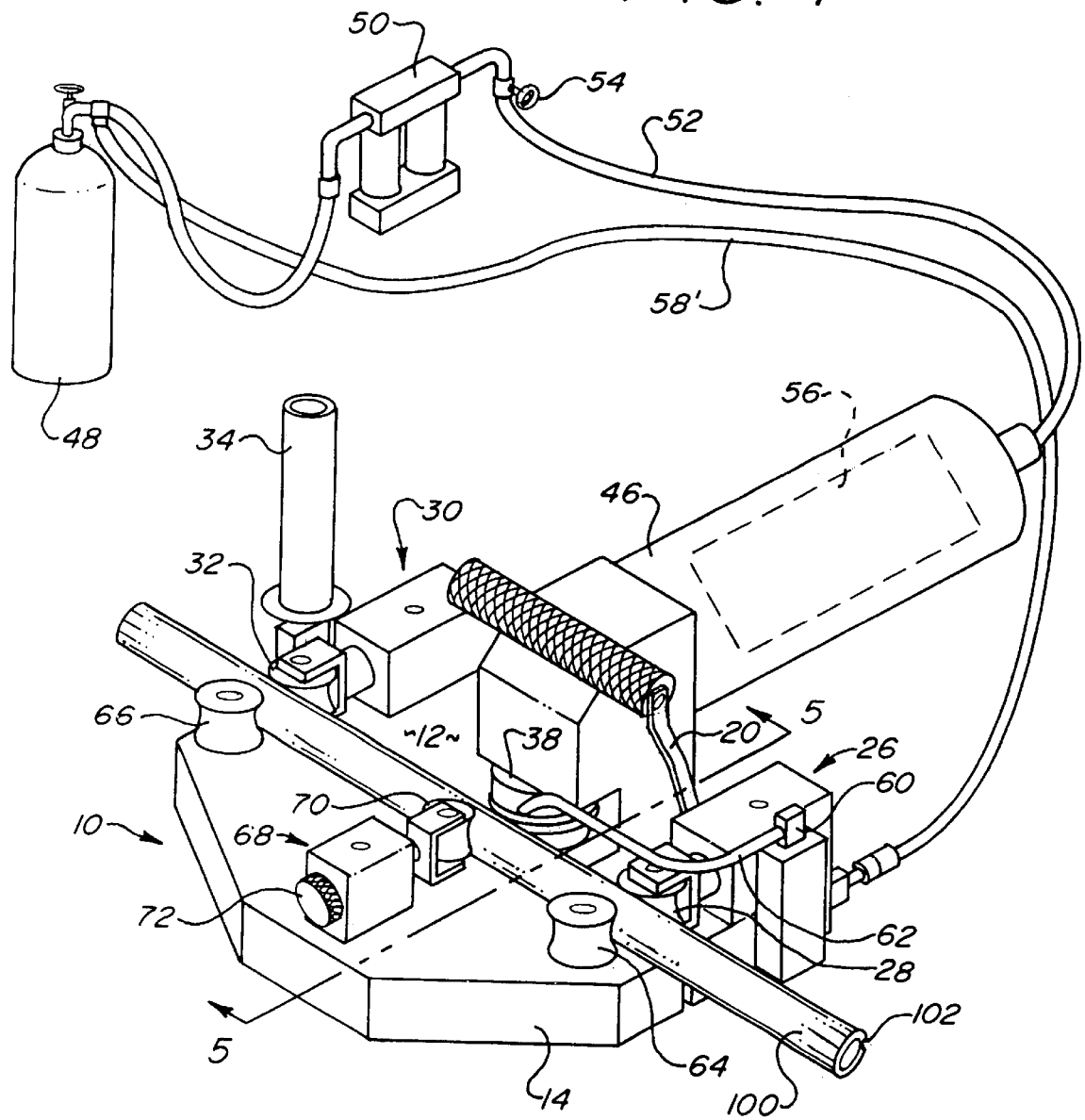
FIG. 7 is an isometric view of the slotter similar to FIG. 1 with an alternate hose configuration.

Alternately, as shown in FIG. 7, only the first air hose 52 air flow connects the two-stage filter system 50 with the air chamber 56 of the rotation means and a second air hose 58' air flow connects the air chamber 48 to the cooling system 60.

Although the device 10 has been described with respect to pneumatic power of the rotation means, it will be appreciated by those skilled in the art that rotation means power can be achieved by any appropriate means including electric or hydraulic. Additionally, cutting blade assembly 38 cooling can be achieved in any appropriate fashion.

A first tube roller 64 is located on the adjustable roller base 14 opposite the first spring loaded roller 28, while a second tube roller 66 is located on the adjustable roller base 14 opposite the second spring loaded roller 32. An opposing roller assembly 68 is located on the adjustable roller base 14 intermediate the first tube roller 64 and the second tube roller 66 and faces the rotatably disposed cutting blade assembly 38. The opposing roller assembly 68 has an opposing roller 70 that travels linearly outwardly toward the cutting blade assembly 38 responsive to rotation of an opposing roller fine adjustment knob 72. Counterrotation of the opposing roller fine adjustment knob 72 causes the opposing roller 70 to travel inwardly away from the cutting blade assembly 38.

In order to utilize the slotting device 10 of the present invention, an appropriate sized cutter blade assembly 38 is selected and appropriately attached to the device 10. In selecting the appropriate size of cutter blade assembly 38, the precise depth of cut into the protective tube 100 is determined. The depth of cut of the cutter blade assembly is exactly equal to one-half of the difference between the diameter of the limiting rollers 40 and the diameter of the cutting blade 42. Thereafter, the actuator linkage 20 is positioned forward—toward the adjustable roller base 14—and a protective tube 100 is positioned between the two tube rollers 64 and 66 and the spring-loaded rollers 28 and 32. The cutting blade 42 is activated and the actuator linkage 20 is positioned rearward until it is locked into place (if necessary, the actuator linkage 20 is adjusted in order to accommodate a narrower or wider protective tube 100, as needed). This secures the protective tube 100 in positions between the two sets of opposing rollers 28,64 and 32,66. The clamping nature of the spring-loaded rollers 64 and 66 assures a snug fit of the protective tube 100 in position. Fine-tune positioning of the protective tube 100 is achieved by the opposing roller assembly 68 by either rotation or counterrotation of the opposing roller fine adjustment knob 72, as appropriate.

A pressurized air source is air flow connected to the two-stage filter system 50 in order to provide power to the rotation means causing rotation of the cutting blade 42 which engages and cuts a slot 102 into the protective tube 100. The user pulls the device 10 along a length of the protective tube 100 via the handle 34, in order to provide a longitudinal slot 102 along the desired length of protective tube 100. The device 10 is controlled by the on/off valve or switch 54 so that cutting blade 42 actuation can be user-controlled whenever the device 10 is air flow connected to the pressurized air source. Cooling and lubrication of the cutting blade assembly 38 is accomplished by standard cooling fluid siphoned from the cooling fluid reservoir due to the pressurized air provided to the cooling system 60 and dispersed onto the cutting blade assembly by the fixed tube 62.

Ideally, the two-stage filter 50 is secured to the belt or hip of the user so that if the hose air flow connecting the pressurized air source to the two-stage filter becomes trapped, such as from a vehicle or person standing on the hose, movement of the device 10 and user will result in a pull on the user's belt or hip and not on the device 10 itself which has a rotating cutting blade 42.

Once the desired slot 102 is made on the tube 100, the device 10 is decoupled from the pressurized air source (or the on/off valve or switch 54 is placed in the off position), the position), the actuator linkage is positioned forward, disengaging the cutting blade and releasing the tube 100 from the two sets of opposing rollers 28,64 and 32,66 and the device 10 is withdrawn.

While the invention has been particularly shown and described with reference to an embodiment thereof, it will be appreciated by those skilled in the art that various changes in form and detail may be made without departing from the spirit and scope of the invention.

I claim:

1. A slotter for cutting a tube comprising:
    a first base having opposing ends;
    a second base, having opposing ends, slidably connected to the first base by a pair of parallel oriented slide rods passing through the first base and secured to the second base for sliding the second base outwardly from the first base;
    a receiving means, attached to the first base and to the second base, for securely and removably receiving the tube;
    a cutting blade, having an upper surface and a lower surface, rotatably and removably secured to the first base, for cutting the tube;
    rotation means for rotating the cutting blade;
    a housing, attached to the first base, containing the rotation means therein; and
    an over center linkage having a first portion operably attached to the housing and a second portion operably attached to the pair of slide rods for providing the outward slide capability of the second base relative to the first base and providing a fixed distance relationship for the second base relative to the first base.
2. The slotter as in claim 1, further including a handle extending upwardly from the first base.
3. The slotter as in claim 1 wherein the housing has a generally cylindrical outer portion to serve as a handle.
4. The slotter as in claim 3 wherein the cylindrical outer portion is knurled.
5. The slotter as in claim 1, further including depth means to control the depth that the cutting blade cuts into the tube.
6. The slotter as in claim 5 wherein the depth control means comprises:
    a first limiting roller, having a diameter smaller than a diameter of the cutting blade, concentrically attached to an upper surface of the cutting blade; and
    a second limiting roller, identical to the first limiting roller, concentrically attached to a lower surface of the cutting blade.
7. The slotter as in claim 1 wherein the receiving means comprises:
    a first roller located on one end of the first base;
    a second roller located on the opposing end of the first base, laterally aligned with the first roller;
    a third roller located on one end of the second base opposite the first roller; and
    a fourth roller located on the opposing end of the second base opposite the second roller.
8. The slotter as in claim 7 wherein the first roller is spring-loaded and the second roller is spring loaded.
9. The slotter as in claim 7 further comprising:
    a fifth roller slidably mounted on the second base intermediate the third roller and the fourth roller opposite the cutting blade; and
    an adjustment knob mechanically connected to the fifth roller;
    wherein rotation of the adjustment knob causes to the fifth roller to slide outwardly toward the cutting blade and counterrotation of the adjustment knob causes the fifth roller to travel inwardly away from the cutting blade.
10. The slotter as in claim 1 further comprising:
    pneumatic means having an air chamber, for powering the rotation means;
    a filter, attached to a compressed air source; and
    a first hose for air flow connecting the filter to the pneumatic means.
11. The slotter as in claim 10 further comprising a cooling means for cooling the cutting blade during tube cutting.
12. The slotter as in claim 11 wherein the cooling means comprises:
    a cooling system having cooling liquid contained therein;
    a second hose air flow connecting the filter to the cooling system; and
    a third hose having one end connected to the cooling system and having the opposing end positioned over the cutting blade.
13. The slotter as in claim 11 wherein the cooling means comprises:
    a cooling system having cooling liquid contained therein;
    a second hose air flow connecting the air chamber to the cooling system; and
    a third hose having one end connected to the cooling system and having the opposing end positioned over the cutting blade.
14. The slotter as in claim 10 wherein the filter is a two stage air filter.
15. The slotter as in claim 1 wherein the over center linkage is adjustable.
16. The slotter as in claim 15 wherein the over center linkage is attached to the pair of slide rods by a connecting rod, an adjuster tie rod and an adjustment knob, wherein
    the connecting rod connects the pair of slide rods to one another distant the second base;
    the adjuster tie rod is connected to the over center linkage; and
    the adjustment knob has a threaded portion passing through the connecting rod and threadably received within the adjuster tie rod;
    wherein rotation of the adjustment knob positions a locking point of the second base farther away from the first base, and counterrotation of the adjustment knob positions the locking point of the second base closer to the first base.

17. A slotter for cutting a tube comprising:

a first base having opposing ends;

a second base, having opposing ends, slidably connected to the first base for sliding outwardly from the first base;

a cutting blade, having an upper surface and a lower surface, rotatably and removably secured to the first base, for cutting the tube;

rotation means for rotating the cutting blade;

a first roller located on one end of the first base;

a second roller located on the opposing end of the first base, laterally aligned with the first roller;

a third roller located on one end of the second base opposite the first roller; and a fourth roller located on the opposing end of the second base opposite the second roller.

18. The slotter as in claim 17 wherein the first roller is spring-loaded and the second roller is spring-loaded.

19. The slotter as in claim 17 further comprising:

a fifth roller slidably mounted on the second base intermediate the third roller and the fourth roller opposite the cutting blade; and an adjustment knob mechanically connected to the fifth roller;

wherein rotation of the adjustment knob causes to the fifth roller to slide outwardly toward the cutting blade and counterrotation of the adjustment knob causes the fifth roller to travel inwardly away from the cutting blade.

\* \* \* \* \*